Patented June 18, 1935

2,005,095

UNITED STATES PATENT OFFICE 2,005,095

PROCESS OF MAKING JELLY

Gordon MacLean, Flushing, N. Y.

No Drawing. Application November 26, 1932,
Serial No. 644,489

3 Claims. (Cl. 99—11)

This invention relates to the manufacture of jelly and an object is to provide an improved jelly making process having such characteristics that the jellying power of all fruits and other jelly making materials is greatly improved and the operation of jelly making accelerated.

The conventional process of making jelly consists in first cooking the fruit such, for example, as cranberries, apples, or the like, to soften it and to liberate the juice, pectin and other constituent parts from the fruit cells. The cooking operation serves to release the fruit acid and pectin, which it seems probable are separated from each other, possibly by cellular tissue, when the fruit is in its natural form, and bring the two together. The cooking temperature accelerates the hydrolysis of the non-jelly forming proto-pectin to produce the jelly forming pectin which is necessary to the jellying operation. The greater the percentage of the proper form of pectin available in the fruit juice, the greater is the jellying power and the less the amount of cooking required after the subsequent addition of the sugar. After the requisite cooking of the raw fruit, the solid particles of the pulp may be separated out if a clear jelly such for example, as apple jelly is to be made, or the separating step may be omitted if a pulp containing jelly such, for example, as cranberry jelly is desired. In the first instance the pulp is filtered out and the juice rendered clear, while in the second the entire pulp remains in the juice and is used in making the jelly, only such extraneous parts as seeds and skins being screened out.

The prepared juice, with or without fruit pulp, is then cooked with sugar to obtain the formation of the pectin-acid-sugar make-up known as jelly. After the proper amount of cooking the material is cooled and sets to form jelly. It is highly desirable, if not essential, to accomplish the necessary hydrolysis of the proto-pectin to form the jelly making pectin in the first cooking operation, and it will be apparent that any operation capable of releasing more juice from the pulp, and of better dispersing the proto-pectin so that it is more thoroughly mixed with the juice should considerably reduce the length of cooking time in the final step.

I have discovered that this can be effectively accomplished by subjecting the cooked pulp obtained from the preliminary cooking step to a mechanical agitation or similar operation capable of disrupting and breaking the cell walls to free the pectous material and disperse it throughout the mass to more effectively mix it with and expose it to the action of the hot fruit acid juice. This operation may be accomplished during the preliminary cooking step, or after such cooking step if the pulp be maintained at approximately the cooking temperature. For example, it will be found satisfactory to employ a multi-bladed mixing turbine rotating at a peripheral speed of from 700 to 1,000 feet per minute in the cooking vessel, and it will be found that such a device will produce a fruit pulp which, when mixed with an equal volume of sugar dissolved in it by the use of the same turbine, will make a firm jelly equal in consistency to standard commercial jelly. The same pulp made without the agitator will not produce a firm jelly unless the subsequent cooking operation is resorted to after the sugar is added.

I have found that pulp so treated will form a jelly upon the sugar being mixed therewith in the manner described when it is only just warm enough to dissolve the necessary amount of sugar.

It will, of course, be apparent that the cell breaking or disrupting operation can be accomplished by other mechanisms and in other ways than that above described. For example, in place of the turbo mixer referred to, a colloid mill can be employed or a high speed rotor with sharpened edges will be found satisfactory. Although I have referred to the operation as one of agitation, it should be distinctly understood that it is the actual breaking up of the cells of the cooked pulp during or immediately after the cooking operation, which breaking up may be accomplished by agitation or any other form of mechanical operation, that constitutes the essential characteristic of the present invention.

I claim:—

1. The process of making jelly from fruit or the like without the addition of extraneous pectin which comprises forming a pulp of said fruit, subjecting said fruit to a violent mechanical agitation to disrupt the cellular particles of the pulp and separate them into finer particles so as to render available the pectin present in the original fruit material and to thoroughly mix it with the natural acids contained in the fruit juices, adding sugar to the material at a temperature sufficient to dissolve it, and allowing the mixture to set and form a jelly.

2. The process of making jelly from fruit or the like without the addition of extraneous pectin which comprises cooking said fruit to form a pulp thereof, subjecting said pulp to violent mechanical agitation to disrupt the cellular particles of the pulp and separate them into finer particles so as to render available the pectin present in the original fruit material and to thoroughly mix it with the natural acids contained in the fruit juices, adding sugar to the material at a temperature sufficient to dissolve it, and allowing the mixture to set and form a jelly.

3. The process of making a jelly from fruit or the like without the addition of extraneous pectin which comprises cooking said fruit to form a pulp thereof, simultaneously with said cooking operation subjecting the said pulp to a violent mechanical agitation to disrupt the cellular particles of the pulp and separate them into finer particles so as to render available the pectin present in the original fruit material and to thoroughly mix it with the natural acids contained in the fruit juices, adding sugar to the material at a temperature sufficient to dissolve it, and allowing the mixture to set and form a jelly.

GORDON MacLEAN.